(12) United States Patent
Lorenzo et al.

(10) Patent No.: US 7,191,127 B2
(45) Date of Patent: Mar. 13, 2007

(54) SYSTEM AND METHOD FOR SPEECH ENHANCEMENT

(75) Inventors: Geydi Lorenzo, Miramar, FL (US); Charles D. Estes, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 786 days.

(21) Appl. No.: 10/328,687

(22) Filed: Dec. 23, 2002

(65) Prior Publication Data

US 2004/0122664 A1 Jun. 24, 2004

(51) Int. Cl.
*G10L 15/20* (2006.01)

(52) U.S. Cl. .................... 704/233; 704/228
(58) Field of Classification Search ........ 704/225–233, 704/207
See application file for complete search history.

(56) References Cited

U.S. PATENT DOCUMENTS

| | | | | |
|---|---|---|---|---|
| 5,550,924 | A * | 8/1996 | Helf et al. | 381/94.3 |
| 6,115,689 | A * | 9/2000 | Malvar | 704/503 |
| 6,131,013 | A * | 10/2000 | Bergstrom et al. | 455/63.1 |
| 6,289,309 | B1 * | 9/2001 | deVries | 704/233 |
| 6,415,253 | B1 * | 7/2002 | Johnson | 704/210 |
| 6,591,234 | B1 * | 7/2003 | Chandran et al. | 704/225 |
| 6,674,865 | B1 * | 1/2004 | Venkatesh et al. | 381/107 |
| 7,016,507 | B1 * | 3/2006 | Brennan | 381/71.6 |
| 2003/0014248 | A1 * | 1/2003 | Vetter | 704/226 |

OTHER PUBLICATIONS

Steve Unger, "Setting Up ALDs for a Meeting or Conference" AN002, Feb. 1995, © Assistive Listening Device Systems (ALDS), Inc. (3 pp.).
Steve Unger, "What is an Assistive Listening Device?" AN004, May 1995, © Assistive Listening Device Systems (ALDS), Inc. (1 p).
Steve Unger, "Solving Interference Problems Affecting Infrared ALDs" AN006, Oct. 1995, © Assistive Listening Device Systems (ALDS), Inc. (3 pp).

* cited by examiner

*Primary Examiner*—Vijay B. Chawan

(57) ABSTRACT

A method and apparatus for reducing noise in a speech signal. A handset or remote unit provides to users with a hearing deficiency, a first mode of operation where noise suppressant/speech enhancement algorithms are used during any auditory-related service. There is also provided, in a related mode of operation, speech filtering for reducing noise in a speech signal received through the microphone and outputting the filtered sound to the speaker. The handset includes a microphone for receiving an auditory sound, a receiver for receiving an auditory signal and a speech filter for suppressing noise in the auditory signal and sound. The speech filter also may be configured to shift the frequency and/or alter the intensity of the auditory signal and sound. The speaker is used for amplifying and outputting the enhanced speech component as an audible sound.

12 Claims, 2 Drawing Sheets

SYSTEM AND METHOD FOR SPEECH ENHANCEMENT

FIELD OF THE INVENTION

The present invention relates generally to noise suppression and, more particularly, to amplifying speech in a noisy environment.

BACKGROUND OF THE INVENTION

Our world is noisy. The reverberations of buzzing traffic, multisonous concerts or the chatter of conversations compose background noise. Individuals suffering hearing impairments, unlike those having normal hearing, are unable to suppress these sounds. The audible components of this interference mix too strongly with the foreground, thereby impeding the localization and segregation of the sound sources. Thus, our world, with its complex soundscapes, becomes very difficult to comprehend for the hearing impaired.

In an attempt to aid the hearing impaired, the technology concept of Assistive Listening Devices (ALD) is known. Such ALD amplification instruments are designed to be helpful in specific listening situations. For instance, specific ALDs are available that are used to amplify the TV, the telephone, sound in theaters, churches and public speakers. Typically, an ALD includes a microphone, amplifier and loudspeaker. Unlike a hearing aid, the microphone is typically located remotely from the body of the ALD device and placed near the sound source to enable the pickup of the desired sound, while minimizing noise.

Efforts have been made to enhance the speech signal in cellular telephone handsets. For example, currently on handsets incorporating iDEN technology, available from Motorola, Inc, of Schaumburg, Ill., when the handset is in an active service call, the background noise is suppressed to allow the second party to clearly hear the iDEN user. However, if the other user is in a very noisy environment, the iDEN user would still hear the background noise along with the foreground signal. Thus, because of these reasons and others, cellular telephones have been characterized as a communication device, but not as an ALD.

DESCRIPTION

In order to address the need for reducing noise in a speech signal having noise as well as other needs, enhancing speech perception within a communications device occurs as follows: the handset or remote unit (RU) provides to users with a hearing deficiency, a mode of operation where noise suppressant/speech enhancement algorithms are used during any auditory-related service. There is also provided, in a related mode of operation, speech filtering for reducing noise in an auditory sound received by the RU and outputting the filtered sound to the speaker. The handset includes a built-in or remote microphone for receiving an auditory sound, a receiver for receiving an auditory signal and a speech filter for suppressing noise in the auditory signal and sound. The speaker, which is either built in or located remotely by way of a headset or the like, is used for amplifying and outputting the speech component as an audible sound.

The enhanced listening mode of operation of the RU is referred to hereafter as Advanced Hearing Mode (AHM). Upon enabling AHM mode in the RU, if the RU enters an active call, any incoming background noise is filtered. That is, when the user enables AHM on the RU, the received signal is also filtered. Hence, if the user is listening to a caller residing in a noisy environment, only speech is heard. The related mode of operation is herein referred to as a Listening feature that is enabled upon entering noisy environments (e.g. supermarkets/restaurants). This feature employs a speech filter for localizing and extracting human speech from the "baseline" noise of the sound entering the microphone of the remote unit. Additionally, the device is able to modify the received signal to within the range of the user's listening sensitivities. Thus, the user is able to hear sounds and speech that normally would be beyond the user's perceptible range of frequencies.

A menu is also provided for allowing the user to customize the signal to background noise ratio (SNR) based on his/her listening sensitivities in the current environment. The menu also provides control for selectively enabling the operating modes. Advantageously, the menu enables customizations based on the current environment and continual tailoring due to hearing loss increases. In addition, the user is able to enable, disable or train the AHM and the Listening feature as necessary to enhance her sensory experience.

Figure 1:
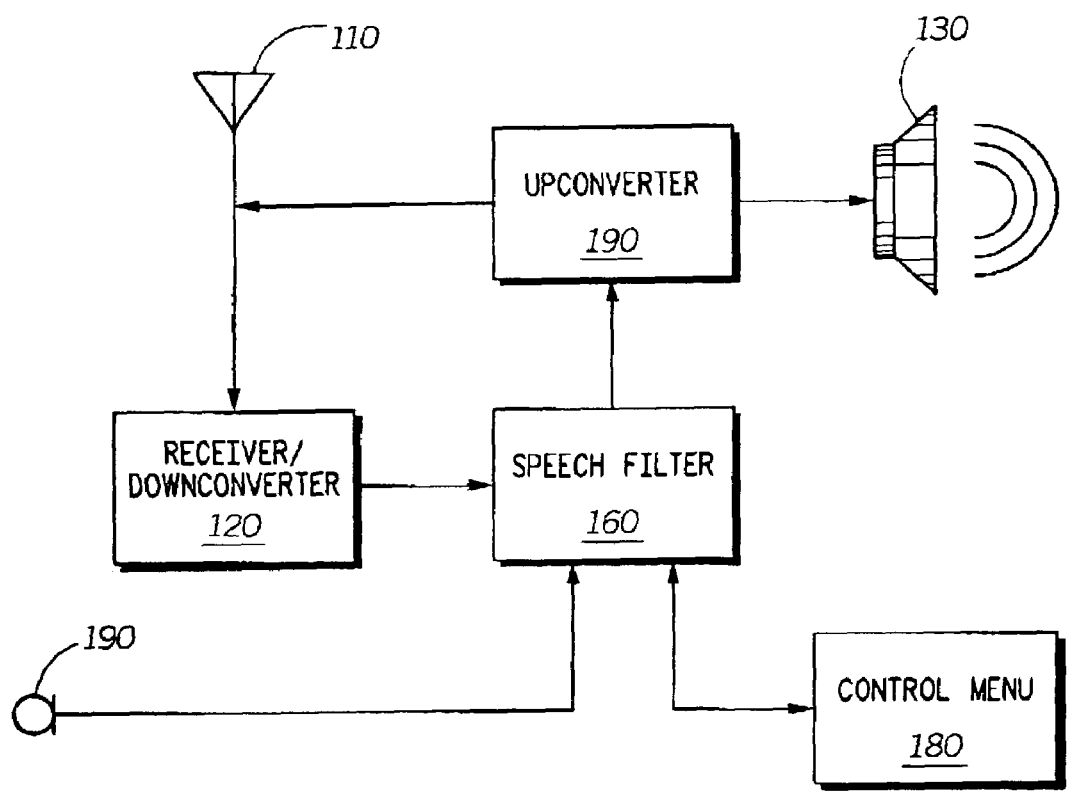
FIG. 1 is a block diagram of the speech enhancement device in accordance with an embodiment of the present invention.

FIG. 1 shows an exemplary speech enhancement device in accordance with an aspect of the invention. The device of FIG. 1 may be used in a wireless device, such as a cellular telephone or an accessory to a cellular telephone, which receives and transmits signals to a far-end user by way of a satellite communications system, or a terrestrial cellular infrastructure. In FIG. 1, signals from a far-end transmitter are received through antenna 110. In a particular embodiment, signals received through antenna 110 may be modulated using a frequency domain multiple access (FDMA) technique, a time division multiple access (TDMA) technique, a code division multiple access (CDMA) technique, or a combination of two or more of the aforementioned techniques.

The received signals are conveyed from antenna 110 to receiver/down converter 120. Receiver/down converter 120 functions to reduce the operating frequency of the signals received through antenna 110 to a base band frequency. Receiver/down converter 120 preferably includes the necessary demodulation and processing equipment in order to remove audio information from the modulated signal. The base band audio signals from receiver/down converter 120 are conveyed to speaker 130 and speech filter 160.

Speaker 130 reproduces the voice signal of the user of the far-end transmitter and presents this audio to one or more users. Speaker 130 may incorporate control features that reduce or increase the audio gain of the reproduced audio signal. Other controls, such as downlink and uplink voice activity detectors, downlink peak power memory elements, voice processors, and those used to modify the tone of the reproduced signal, may also be included.

The speech filter 160 is coupled to an up-converter 190 to enable voice from microphone 190 to be transmitted to a far-end user through antenna 110. The speech filter 160 localizes and extracts human speech from the baseline noise since the spectral variations that characterize speech differ from that of noise whose amplitude and pitch tend to change at a slower pace. The up-converter 190 desirably employs the necessary modulation and mixing elements required to convert the outgoing voice signal to a higher frequency signal in order to radiate the signal by way of antenna 110.

A control menu 180, in an exemplary embodiment, is selected using a menu or function button on the RU. The control menu 180, which may be a software or firmware program within the RU, is in communication with the speech filter 160 and provides several customizable functions, including allowing the user the ability to customize or train the signal to background noise ratio (SNR) based on the user's listening sensitivities in the current environment. The SNR value is then used to guide the level of noise suppression/signal amplification performed by the speech filter 160 when the user's preference is selected. The control menu also is used to enable the operating modes of the RU, including AHM and Listening mode, as well as disabling any and all of the speech enhancement features. A particularly useful feature of the control menu 180 is the ability of the user to store several speech filter profiles that correspond to different SNR environments.

In another aspect, the speech filters may be used to further enhance the user's ability to hear speech or other sounds that are normally inaudible or otherwise indecipherable due to the user's hearing problems. In particular, one or more speech filters are configured such that the received signal is shifted into a frequency range that the user is able to more clearly hear. There are several known algorithms/transformations that can be used for providing this function (and are therefore not further discussed herein).

Typically, normal audible sound is within the 20 Hz to 20 kHz range. However, it is not uncommon for people, as they age or for other reasons, to be unable to hear sounds in the higher frequency ranges, resulting in a person having high-frequency hearing loss. Similarly, people may also experience hearing loss in the lower frequencies. In either case, the filter is configured so that the signal is shifted into the user's hearing range. This affects the pitch of the sound so as to make the signal more easily heard by the user. The sound intensity (in decibels) of the received signal also may be changed in a similar way.

Figure 2:
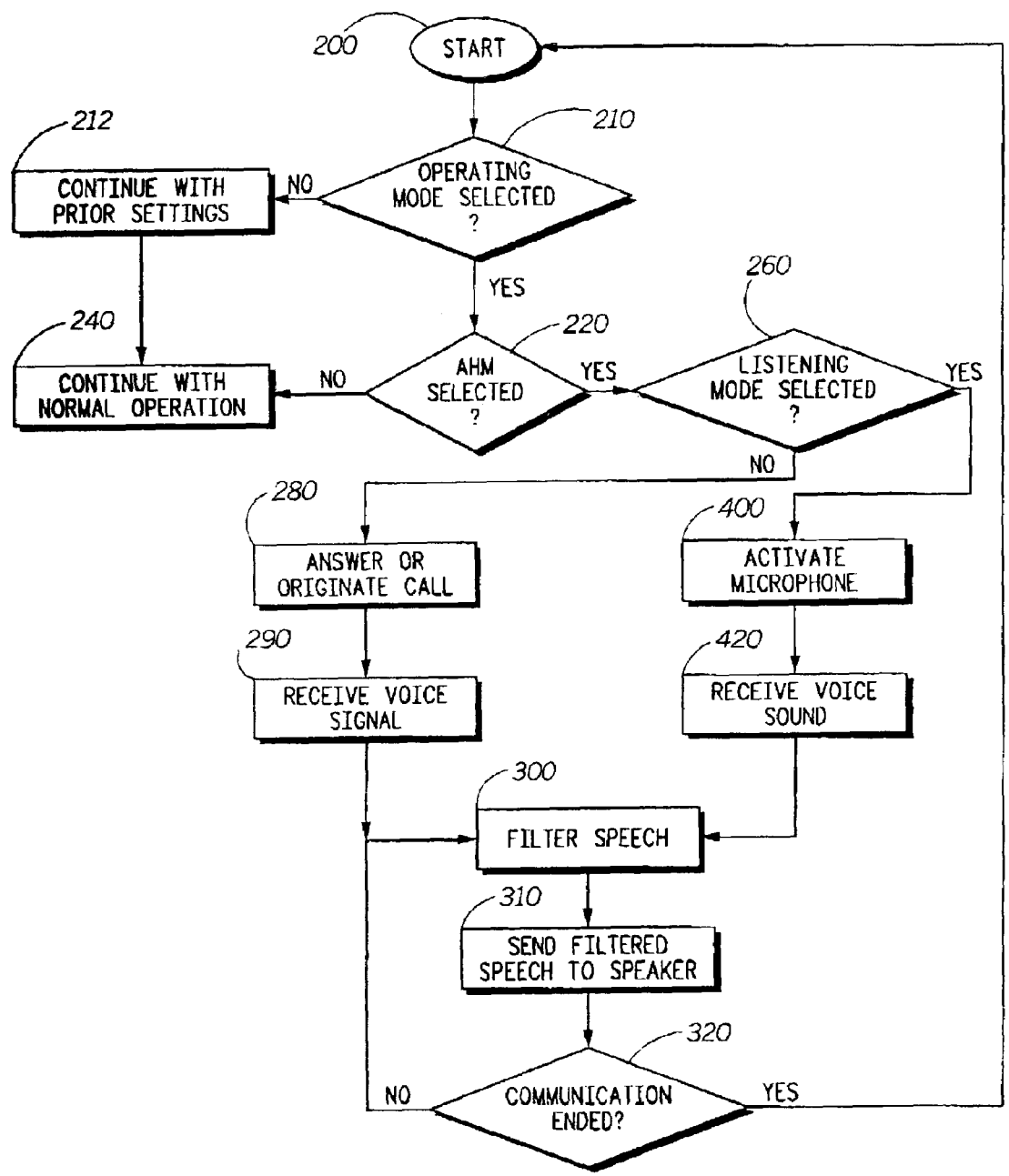
FIG. 2 is a flow diagram illustrating the speech enhancement device of FIG. 1 in operation in accordance with an embodiment of the present invention.

FIG. 2 shows the speech enhancement system and method in an exemplary mode of operation. In step 200, the user starts communication using the RU. This may be in the form of powering up the RU and/or pressing or selecting a button from the RU to initiate a communication function. In step 210 the user may choose to enter the control menu and select a particular operating mode or cancel any previously selected operating mode. Otherwise, in step 212 the user may continue with the previous settings by doing nothing and continue with normal operation in step 240, which may include call operation without activating the speech filter. In step 220, the system determines whether AHM is selected for the RU. If, upon entering the control menu, the user decides to exit AHM, then in step 240 the RU continues in its normal or native mode of operation.

However, the user may instead in step 220 opt to activate the AHM feature. If so, the user is then provided in step 260 the choice of entering the Listening mode of operation. If the user does not engage Listening mode, then the RU enters its native mode of operation with the additional feature that all voice signals destined for the speaker is first filtered by the speech filter to remove background noise. In step 280, the user is able to answer or originate calls as if the RU were operating in its native mode. In step 290, the user's RU receives a voice signal from a remote party. Prior to sending the voice signal to the speaker, in step 300 the speech is filtered first to enhance the voice quality and decrease background noise. In step 310, the filtered sound is then sent to the speaker for amplification. This process is repeated until the call is terminated or the communication is ended in step 320 by the user powering down the RU or selecting a different mode of operation.

If in step 260 the user selects the listening mode of operation, then the microphone (either internal or external) on the RU is opened in step 400. In step 420 the RU captures the voice signal, which includes speech and noise components. The voice signal is filtered in step 300 to eliminate the background noise. The filtered signal is then sent to the speaker in step 310 for listening by the user. This process is repeated until the call is terminated or the communication is ended in step 320 by the user powering down the RU or selecting a different mode of operation.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for enhancing speech perception in a communications device:
   providing a cellular telephone having a signal receiver for receiving a voice signal from a receiver via an antenna, a microphone for capturing a voice signal, a speaker for outputting an audible sound, and an upconverter for selectively upconverting the voice signal captured by the microphone or routing it to the speaker;
   selecting at a control menu either the receiver or the microphone for an advanced hearing mode;
   receiving the voice signal into the cellular telephone via which of the receiver or microphone as selected, wherein the voice signal comprises a speech component and a noise component;
   separating the voice signal into speech and noise components; and
   routing the speech component of the voice signal to the speaker.

2. The method of claim 1, wherein the separating step comprises filtering the voice signal to remove the noise component.

3. The method of claim 1, wherein the separating step comprises processing the voice signal to enhance the speech component and suppress the noise component.

4. The method of claim 1, further comprising the step of customizing the signal to noise ratio of the received voice signal.

5. The method of claim 4, wherein the customizing step comprises setting the signal to noise ratio to a predetermined level based on the based on a listener's preference.

6. The method of claim 5, further comprising the step of storing multiple custom predetermined signal to noise ratio levels, each custom predetermined signal to noise ratio level corresponding to a particular environment.

7. The method of claim 6, further comprising the step of storing the multiple custom predetermined signal to noise ratio levels in a selectable menu system for enabling the user to select the appropriate custom predetermined signal to noise ratio level.

8. A cellular telephone comprising:
a microphone for receiving an auditory sound;
a receiver for receiving an auditory signal via a receiver coupled to an antenna, wherein the auditory signal is received wirelessly from a cellular infrastructure;
a speech filter for suppressing noise in the auditory signal and the auditory sound for enhancing a speech component of the auditory signal and the auditory sound; and
a speaker for amplifying and outputting the speech component as an audible sound; wherein the cellular telephone provides a control menu for selecting either the receiver or microphone for outputting the corresponding speech component.

9. The remote unit of claim 8 wherein the control menu further allows setting an operating parameter of the speech filter.

10. The remote unit of claim 9, wherein the control menu comprises means for setting a signal to noise ratio of the filter based on a listening environment of a user.

11. The remote unit of claim 10, wherein multiple custom signal to noise ratio settings maybe stored in the remote unit.

12. The remote unit of claim 11, wherein the control menu further comprises a selectable menu system for enabling the user to select the custom predetermined signal to noise ratio level appropriate for the user.

* * * * *